United States Patent [19]

McMahon

[11] Patent Number: 5,074,249
[45] Date of Patent: Dec. 24, 1991

[54] TOY AND METHOD FOR MAKING THE TOY

[76] Inventor: Paul W. McMahon, 568 President St., Brooklyn, N.Y. 11215

[21] Appl. No.: 576,685

[22] Filed: Aug. 31, 1990

[51] Int. Cl.⁵ ............................................. A01K 29/00
[52] U.S. Cl. ...................................................... 119/29
[58] Field of Search ................. 119/29, 29.5; 446/369, 446/387

[56] References Cited

U.S. PATENT DOCUMENTS

| | | | |
|---|---|---|---|
| 3,107,651 | 10/1963 | Beck | 119/29 |
| 3,476,086 | 11/1969 | Way | 119/29 |
| 4,770,123 | 9/1988 | Bell | 119/29 |

FOREIGN PATENT DOCUMENTS 2402346  7/1975  Fed. Rep. of Germany ........ 119/29

*Primary Examiner*—Robert P. Swiatek
*Attorney, Agent, or Firm*—R. Neil Sudol; Henry D. Coleman

[57] ABSTRACT

A method for making a mouse toy for cats comprises the steps of (a) providing a strip of flexible sheet material and an elongate flexible tensile element, the strip of sheet material having a width shorter that a length of the tensile element, and (b) wrapping the strip about the tensile element proximately to one end thereof to form a substantially cylindrical roll of the strip about the tensile element, such that opposite ends of the tensile element extend from opposite sides of the roll. Upon formation of the roll, the opposite ends of the tensile element are drawn towards one another and tied in a knot so that the roll is deformed to assume a partially arcuate shape and so that one of the opposite ends extends in one direction and the other of the opposite ends ends in a substantially opposite direction, whereby the deformed roll and the tensile element together assume an aspect of a mouse. A long end of the tensile element becomes the analog of a mouse's tail while the other end, if sufficiently short, can take on the appearance of a foot of the toy mouse formed in accordance with the present invention. The arcuate shape of the roll again simulates the appearance of a mouse's back.

6 Claims, 3 Drawing Sheets

TOY AND METHOD FOR MAKING THE TOY

BACKGROUND OF THE INVENTION

This invention relates to a toy, particularly a toy for cats. This invention also relates to a method for making such a toy.

Animal lovers have created many toys for their pets. In particular, rubber mice for cats to play with are fairly common. Other toys for cats include variously shaped articles filled with catnip or other with provided with a similar scent. Catnip toys can result in messes for owners, in the event that the bits of catnip are released from containment.

OBJECTS OF THE INVENTION

An object of the present invention is to provide a toy for cats which is inexpensive and simple to make.

Another object of the present invention is to provide such a toy which takes on the appearance of a mouse.

Another, more particular, object of the present invention is to provide such a toy which is made of materials which cats like to chew.

A further particular object of the present invention is to provide such a toy which does not require the use of catnip in order to retain a cat's interest.

Yet another object of the present invention is to provide an inexpensive and simple method for making a toy for cats.

Another object of the present invention is to provide such a method wherein the toy takes on the appearance of a mouse.

SUMMARY OF THE INVENTION

A method for making a toy for cats comprises, in accordance with the present invention, the steps of (a) providing a strip of flexible sheet material and an elongate flexible tensile element, the strip of sheet material having a width shorter that a length of the tensile element, and (b) wrapping the strip about the tensile element proximately to one end thereof to form a substantially cylindrical roll of the strip about the tensile element, such that opposite ends of the tensile element extend from opposite sides of the roll. Upon formation of the roll, the opposite ends of the tensile element are drawn towards one another and tied in a knot so that the roll is deformed to assume a partially arcuate shape and so that one of the opposite ends extends in one direction and the other of the opposite ends ends in a substantially opposite direction, whereby the deformed roll and the tensile element together assume an aspect of a mouse. A long end of the tensile element becomes the analog of a mouse's tail while the other end, if sufficiently short, can take on the appearance of a foot of the toy mouse formed in accordance with the present invention. The arcuate shape of the roll again simulates the appearance of a mouse's back.

Preferably, the sheet material is a leather or a chamois material. Also, it is preferable if the tensile leather is leather, for example, a leather shoelace. It is believed that these materials are particularly enjoyed by cats chewing on the materials.

In addition, it is advantageous that the knot take the form of a square knot. In a square knot, the two free ends of the tensile element extend in opposite directions and the one direction is approximately parallel to a longitudinal axis of the roll.

Initially, upon its formation, the roll has a free edge extending substantially parallel to the tensile element. Thus, prior to the step of drawing the opposite ends of the tensile element together, the free edge is disposed on one side of the roll extending in a longitudinal direction between the opposite sides. Pursuant to another feature of the present invention, the knot is formed on the longitudinal side of the roll along which the free edge of the strip of sheet materials extends. This step in the method results in the formation of a crumpled ear feature in the region of the square knot. The ear facilitates a standing of the toy mouse on the knot, whereby the arcuate back of the roll faces upwardly.

A toy for cats comprises, in accordance with the present invention, an elongate flexible tensile element and a strip of flexible sheet material wrapped about the tensile element proximately to one end thereof. Opposite ends of the tensile element protruding from opposite sides of the roll are tied to one another in a knot on one side of the roll, the roll being deformed by the knotted tensile element so that a side of the roll opposite the knot assumes a smooth arcuate shape. One of the opposite ends of the tensile element is substantially longer than the other of end and extends in one direction while the other end of the tensile element extends in a substantially opposite direction. The deformed roll of sheet material and the tensile element together assume an aspect of a mouse.

A toy mouse manufactured in accordance with the present invention is inexpensive and simple. The materials are minimal, little or no tooling is required and the labor may be unskilled.

The toy mouse is enjoyed by cats, it part because of the materials, in part because of the mouse shape.

DETAILED DESCRIPTION

Figure 1:
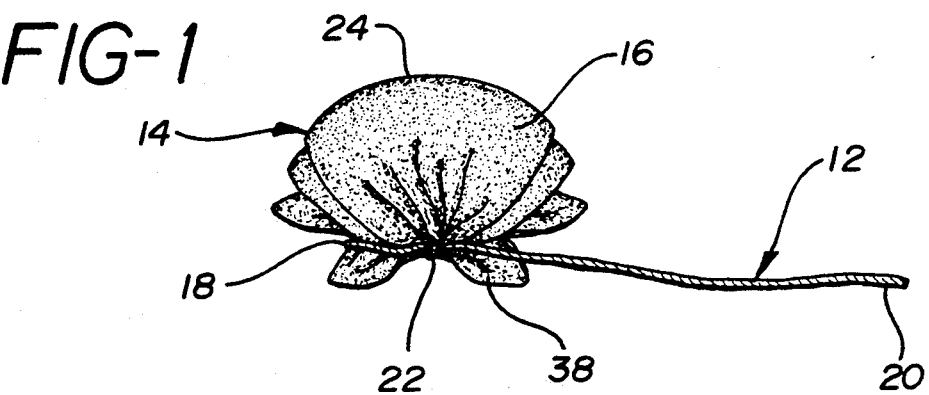
FIG. 1 is a side view of a toy mouse in accordance with the present invention.
Figure 2:
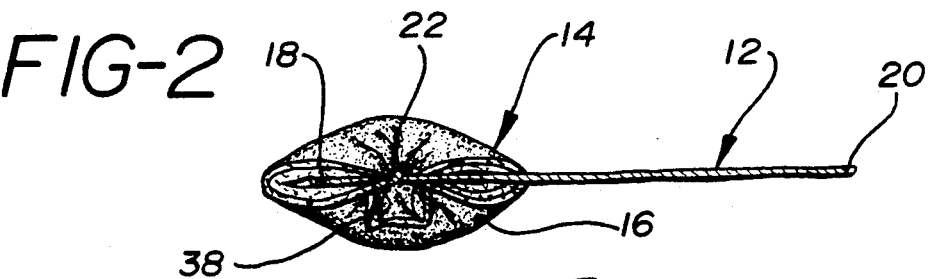
FIG. 2 is a bottom view of the toy mouse of FIG. 1.

As illustrated in FIGS. 1 and 2, a toy mouse for cats comprises an elongate flexible tensile element 12 and a strip of flexible sheet material 14 (see FIG. 3) wrapped in a roll 16 about the tensile element proximately to one end 18 thereof. Opposite ends 18 and 20 of tensile element 12 protrude from opposite sides of roll 16 and are tied to one another in a knot 22 on one side of the roll. Roll 16 is deformed by knotted tensile element 12 so that a side 24 of the roll opposite knot 22 assumes a smooth arcuate shape, simulating an arced back of a mouse.

End portion 20 of tensile element 12 is substantially longer than end portion 18 and extends in one direction while end 18 extends in a substantially opposite direction. End portion 20 thus assumes the aspect of a tail of the simulated mouse, while end portion 18, tucked under roll 16, simulates a foot of the mouse.

Figure 3:
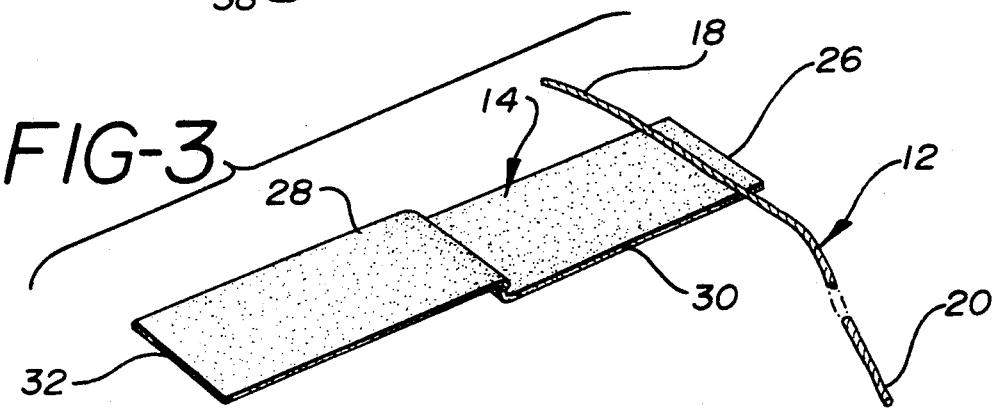
FIG. 3 is a perspective view showing an elongate tensile element positioned along one edge of a strip of flexible sheet material, in an early stage of a manufacturing process in accordance with the present invention.

As illustrated in FIG. 3, the toy mouse is made by initially positioning a portion of tensile element 12 along a transverse edge 26 of sheet material 14 so that the tensile element is oriented substantially parallel to edge 26 and so that ends 18 and 20 extend beyond longitudinal edges 28 and 30, respectively. It is to be noted that sheet material 14 has a width, equal to the length of edge 26, which is substantially less than the length of tensile element 12.

Figure 4:
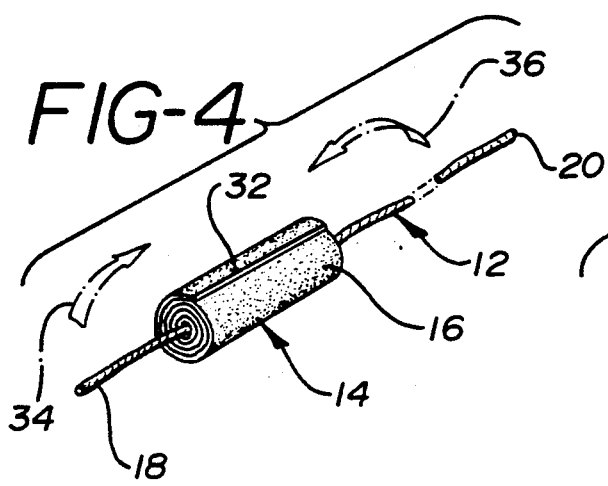
FIG. 4 is perspective view showing the strip of flexible sheet material of FIG. 3 wrapped around the tensile element to form a roll, in a subsequent stage of the manufacturing process.
Figure 5:
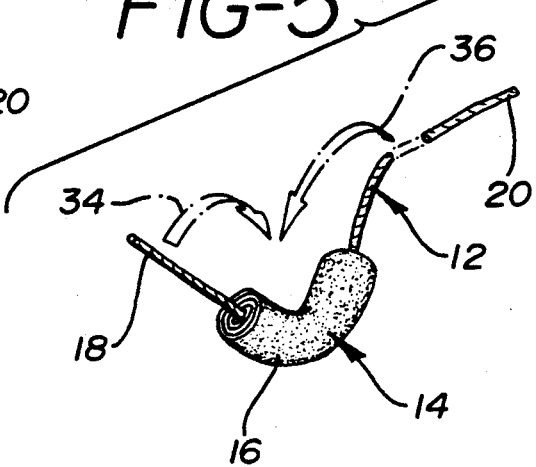
FIG. 5 is a perspective view showing a deformation of the roll of FIG. 4, prior to tying of the two opposite ends of the tensile element, in accordance with the present invention.
Figure 6:
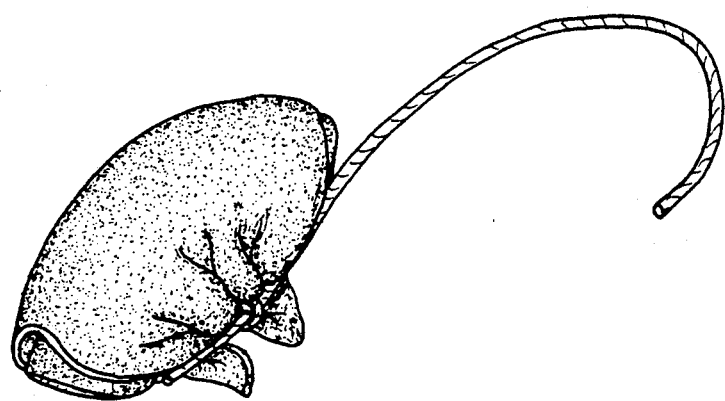
FIG. 6 is a top right front perspective view of the toy mouse for cats, of FIGS. 1 and 2.
Figure 7:
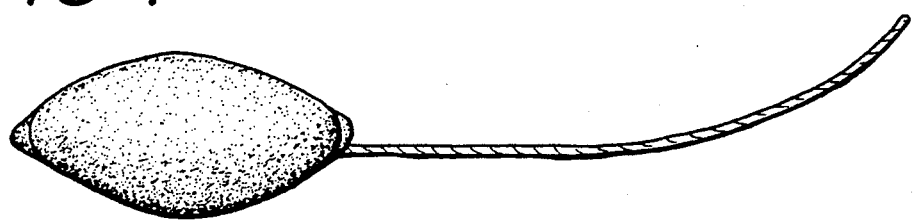
FIG. 7 is a top view of the toy mouse of FIGS. 1, 2 and 6.
Figure 8:
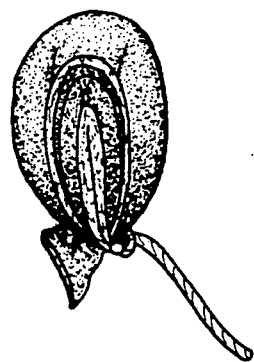
FIG. 8 is a front view of the toy mouse of FIGS. 1, 2, 6 and 7.
Figure 9:
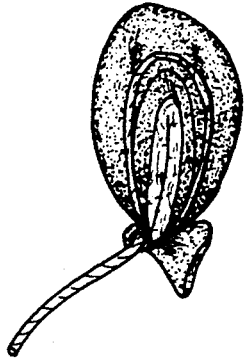
FIG. 9 is a rear elevational view of the toy mouse of FIGS. 1, 2 and 6–8.
Figure 10:
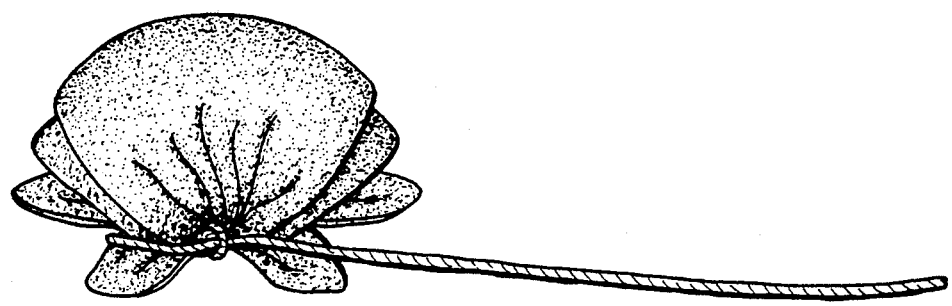
FIG. 10 is a right side elevational view of the toy mouse of FIGS. 1, 2 and 6–9.
Figure 11:
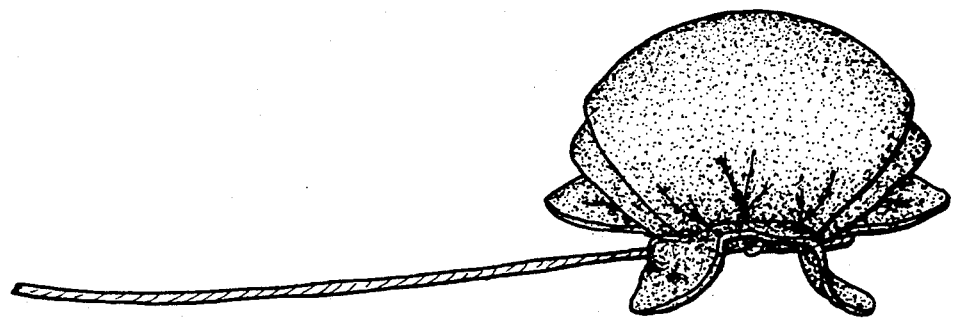
FIG. 11 is a left side elevational view of the toy mouse of FIGS. 1, 2 and 6–10.

Upon the relative positioning of tensile element 12 and sheet material 14, the sheet material is then wound or wrapped about tensile element 12 to form roll 16, as depicted in FIG. 4. In the wound configuration of sheet material 14 shown in FIG. 4, a free transverse edge 32 of the sheet material extends generally parallel to tensile element 12. As illustrated in FIG. 5, roll 16 is then bent or deformed by pulling ends 18 and 20 of tensile element 12 towards one another, as indicated by arcuate arrows 34 and 36. Ends 18 and 20 are pulled over the free end portion 38 of sheet material 14 in the region of edge 32, whereby end portion 38 forms a rumpled flap or ear-like extension upon the formation of knot 22.

Sheet material 14 is preferably not so thin as to be a foil but is fairly thick. Sheet material 14 advantageously takes the form of a soft leather or chamois material. Tensile element 12 is preferably a leather shoe lace segment.

FIGS. 6–11 show additional views of the toy mouse of FIGS. 1 and 2.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proferred by way of example to facilitate comprehension of the invention and should not be construed to limit the scope thereof.

What is claimed is:

1. A method for making a toy for cats, comprising the steps of:
    providing a strip of flexible sheet material;
    providing an elongate flexible tensile element, said strip of sheet material having a width shorter that a length of said tensile element;
    wrapping said strip about said tensile element proximately to one end thereof to form a substantially cylindrical roll of said strip about said tensile element, such that opposite ends of said tensile element extend from opposite sides of said roll;
    upon formation of said roll, drawing said opposite ends towards one another and tying said opposite ends in a knot so that said roll is deformed to assume an arcuate shape and so that one of said opposite ends extends in one direction and the other of said opposite ends ends in a substantially opposite direction, whereby the deformed roll and said tensile element together assume an aspect of a mouse.

2. The method set forth in claim 1 wherein said sheet material is a leather.

3. The method set forth in claim 1 wherein said sheet material is a chamois material.

4. The method set forth in claim 1 wherein said tensile element is leather.

5. The method set forth in claim 1 wherein said knot is a square knot and said one direction is approximately parallel to a longitudinal axis of said roll.

6. The method set forth in claim 1 wherein said roll has a free edge extending substantially parallel to said tensile element prior to said step of drawing, said free edge being disposed on one side of said roll extending between said opposite sides, said knot being formed on said one side of said roll.

* * * * *